United States Patent [19]

Rinkewich

[11] Patent Number: 4,666,748
[45] Date of Patent: May 19, 1987

[54] ARTICLES OF FURNITURE

[76] Inventor: Isaac Rinkewich, 12 Fishman Maimon St., Tel Aviv, Israel

[21] Appl. No.: 802,025

[22] Filed: Nov. 25, 1985

[30] Foreign Application Priority Data

Dec. 25, 1984 [IL] Israel ............................. 73929

[51] Int. Cl.$^4$ ............................................. A47B 3/06
[52] U.S. Cl. .................................. 428/12; 297/284; 428/53; 428/122
[58] Field of Search ............... 5/110, 112, 111, 114, 5/431, 468; 297/284, 373, 440; 428/53, 12, 122

[56] References Cited

U.S. PATENT DOCUMENTS

| | | | |
|---|---|---|---|
| 2,208,945 | 7/1940 | Miller | 297/337 |
| 2,312,379 | 3/1943 | Bechik | 5/468 |
| 3,390,044 | 6/1968 | Malakoff | 428/53 X |
| 3,598,444 | 8/1971 | Seiter | 297/440 |
| 3,736,027 | 5/1973 | Stafford | 5/468 X |
| 4,008,548 | 2/1977 | Leclerc | 428/53 X |
| 4,222,695 | 9/1980 | Sarides | 428/53 X |
| 4,477,394 | 10/1984 | Armstrong et al. | 428/188 X |
| 4,508,384 | 4/1985 | Castelot et al. | 297/284 |

Primary Examiner—Henry F. Epstein
Attorney, Agent, or Firm—Benjamin J. Barish

[57] ABSTRACT

An article of furniture comprises a plurality of plastic sections each curved at its opposite ends according to the same radius of curvature, with each section having notches at its opposite ends of a length twice that of the radius of curvature. Fastener means are receivable in the notches of adjacent sections and couple the sections together. Several embodiments are described having different fastener means, including one arrangement wherein they are separate pin and link members, a second arrangement wherein they are pins inserted into sockets integrally formed with the plastic sections, and two further arrangements wherein they are pins integrally formed with the plastic sections and receive separate link members.

17 Claims, 27 Drawing Figures

4,666,748

ARTICLES OF FURNITURE

BACKGROUND OF THE INVENTION

The present invention relates to articles of furniture, and particularly to articles of furniture capable of serving many uses and/or of assuming many different positions.

Many types of multiple-use and/or multiple-position articles of furniture have been devised, but there is still need for such an article of furniture which is of simple and inexpensive construction, requiring but a few simple parts, and capable of being conveniently assembled to serve any one of several types of furniture articles, or to assume any one of several different positions of the furniture article. An object of the present invention is to provide such an article of furniture.

SUMMARY OF THE INVENTION

According to a broad aspect of the present invention, there is provided an article of furniture characterized in that it includes a plurality of sections each curved at its opposite ends according to the same radius of curvature, each section having notches at its opposite ends of a length twice that of said radius of curvature, and fastener means receivable in said notches of adjacent sections and coupling said sections together.

In some described embodiments, the fastener means comprises a socket formed at each end of each of the sections, and a pin receivable in each of said sockets. Several embodiments further include links each formed with a pair of openings for receiving said pins. These embodiments permit a plurality of sections to be assembled together according to various configurations to define different articles of furniture, or to define a single article of furniture capable of different angular adjustments.

According to another described feature, the article of furniture is particularly useful as a bed or table which may be conveniently folded into a compact form for storage or transportation, each of the sections is of sheet material having downwardly bent flanges, the article further including inwardly facing sockets formed in the underface of the sheet material and legs receivable within said latter socket and pivotable therein either to an extended position to support the sections horizontally for use, or to a folded position against its respective section to permit them to be folded compactly against each other for storage or transportation.

According to a further preferred feature in the latter embodiment, the legs are constituted of U-shaped members each including a pair of legs joined together by a bridge, each of the bridges being deformable to permit the respective U-shaped member to be snapped into the sockets for mounting therein.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

The Embodiment of FIGS. 1–9

Figure 1:
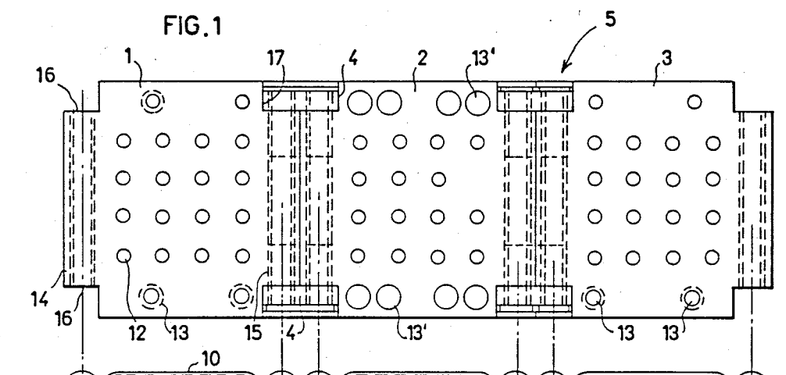
FIG. 1 is a top plan view illustrating one form of furniture article constructed in accordance with the present invention.
Figures 2, 3, 4, 5:
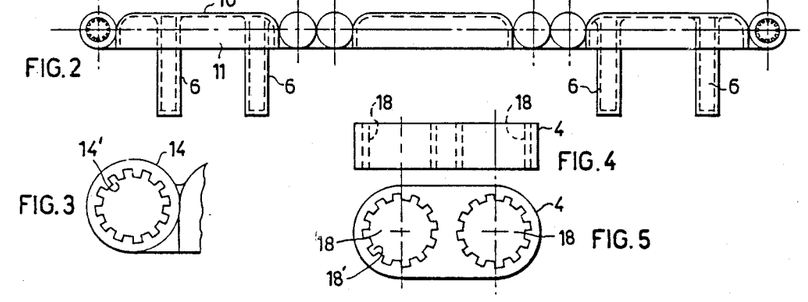
FIG. 2 is a side elevational view of the article of furniture illustrated in FIG. 1.
FIG. 3 is an enlarged side-elevational view illustrating the end structure of each section included in the furniture article of FIGS. 1 and 2.
FIG. 4 is a top plan view illustrating one of the links included in the furniture article of FIGS. 1 and 2.
FIG. 5 is a side elevational view illustrating the link of FIG. 4.
Figure 6:
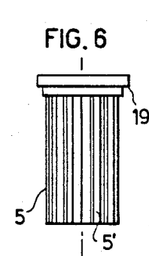
FIG. 6 is a top plan view illustrating one of the pins included in the furniture article of FIGS. 1 and 2.
Figure 7:
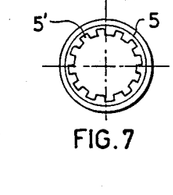
FIG. 7 is a side elevational view of the pin of FIG. 6.

The article of furniture illustrated in FIGS. 1 and 2 conmprises three basic sections, generally designated 1, 2 and 3, respectively. They may all be of the same construction so as to provide modularity to the article, enabling a plurality of such sections to be assembled together according to various configurations to define different furniture articles. The three sections 1, 2 and 3 illustrated in FIGS. 1 and 2 are assembled together by the use of a plurality of links 4 (FIGS. 4 and 5) and a plurality of pins 5 (FIGS. 6 and 7). The illustrated furniture article further includes a plurality of tubular members 6 (FIG. 2) receivable within holes formed in sections 1, 2, or 3, to serve as supporting legs.

With reference to section 1 (the other two sections 2 and 3 being similarly constructed), it will be seen that this section is made of a flat plastic sheet 10 integrally formed around its periphery with a down-turned flange or margin 11. The flat plastic sheet is further formed with a plurality of small-diameter holes 12 throughout most of its area, and with a plurality of larger-diameter holes 13 along its opposite sides. Holes 12 are provided mainly for ventilation and weight-reduction purposes, whereas holes 13 are provided mainly for receiving the tubular members 6 serving as the supporting legs.

A tubular socket 14 is secured, as by plastic-bonding, to one side of plastic section 1, and another tubular socket 15 is similarly secured to the opposite side. The two sockets 14 and 15 are centrally located and of a slightly shorter length than their respective sides of the plastic section, so as to define cut-outs or notches 16, 17 at the corners of both sides of the plastic section. The two tubular sockets 14, 15 are of the same diameter so that, when applied to their respective ends of sections 1, 2, 3, they impart to the end of the section, a curvature of the same radius, namely of that of the tubular members. The notches 16, 17 defined by tubular sockets 14, 15 therefore have a length equal to the diameter of the tubular socket 14, 15, namely twice their radius of curvature. Links 4 are each of a length twice that of each notch 16, 17, i.e. four times the radius of curvature of tubular sockets 14, 15, so that when two plastic sections are placed in side-by-side relationship, a link fits in each pair of notches at the ends of the two adjacent sections.

Links 4 are formed with two bores 18 (FIGS. 4, 5) each aligned with one of the sockets 14, 15 at the respective sides of the two plastic sections.

Pins 5, bores 18 formed in links 4, and sockets 14, 15 secured to the ends of the plastic sections 1, 2, 3, are all splined by the provision of axially-extending ribs and grooves, as shown at 5', 18' and 14', respectively, so that when the sections are assembled together by the use of these pins, links and sockets, the sections are fixed in angular positions with respect to each other. Pins 5 are formed with enlarged heads 19 to facilitate their insertion and removal from the sockets and the links. The height of each link 4 is shorter than the height of each notch 16, 17 such that the enlarged heads 19 of pins 5 received within the notches will be flush with the outer edges of the plastic sections 1, 2, 3.

Figure 9:
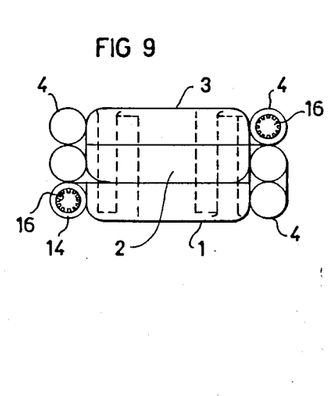
FIG. 9 is a side elevational view illustrating a folded arrangement of the furniture article of FIGS. 1 and 2 for storage or transportation.

As mentioned earlier, the larger diameter holes 13 are intended for the tubular members 6 serving as the supporting legs. For this purpose, tubular members 6 are receivable with a friction fit in selected holes 13 of the plastic sections. Preferably, the two end sections 1 and 3 each include two holes 13, and the middle plastic section 2 includes four holes 13', along each of their two opposite edges; also, holes 13' of section 2 are preferably of larger diameter than holes 13 in sections 1 and 3. The larger diameter holes 13' thus accomodate the tubular legs 6 when the article of furniture is folded into its compact configuration, as illustrated in FIG. 9, for purposes of storage or transportation.

It will thus be seen that the plastic sections 1, 2, and 3 may be assembled in different angular positions with respect to each other, in order to produce different articles of furniture, or to produce a single article of furniture capable of different angular adjustments. For example, section 2 may be secured to section 1 in any desired angular position by merely holding section 2 in the desired angular position, inserting a link 4 into the notch defined by notches 16, 17, at each of the two sides, and then inserting pins 5 into the aligned bores in links 4 and sockets 14, 15 of the two sections. Since pins 5, as well as the bores in sockets 14 and 15 and the bores in links 4, are all splined, the pins will fix the two plastic sections together in the specific angular position at which they were assembled, and will not permit one to rotate with respect to the other.

FIG. 1 and 2 illustrate the three plastic sections 1, 2 and 3 assembled in the above-described manner to form a horizontal supporting surface, such as a bed or cot. In this case, tubular members 6 are friction-fitted within selected holes 13 in the ends of plastic sections 1 and 3, for supporting the bed or cot in the illustrated horizontal position.

Figure 8:
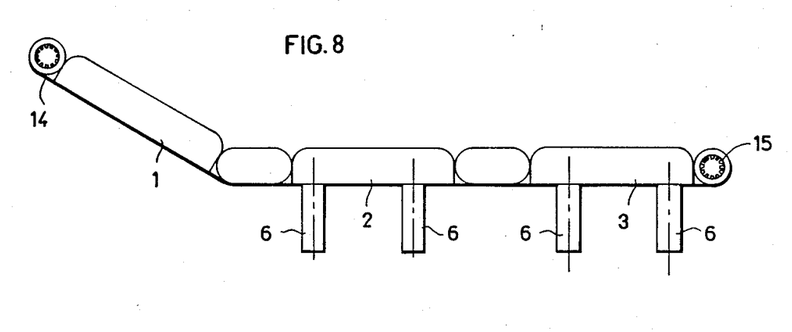
FIG. 8 is a side elevational view illustrating one arrangement of the furniture article of FIGS. 1 and 2.

FIG. 8 illustrates the three plastic sections 1, 2 and 3 of FIGS. 1 and 2 fixed so as to provide a reclining cot or lounge, in which case the first plastic section 1 is fixed at an angle, e.g., 45°, with respect to its adjacent plastic section 2. Also the legs 6 are applied to sections 2 and 3, rather than to sections 1 and 3 as in FIGS. 1 and 2.

It will be appreciated that the illustrated article of furniture can be assembled in many further configurations, for example to define a table, a straight-backed chair, the floor or base of a tent, and the like, by merely providing the appropriate number of plastic sections and assembling them in the desired angular relationship to each other.

When the article of furniture is to be folded into a compact form for storage or transportation, the pins 5 are removed, and all the sections are then folded one on top of the other, as shown in FIG. 9, whereupon the pins may be reinserted.

The Embodiment of FIGS. 10–13

Figure 10:
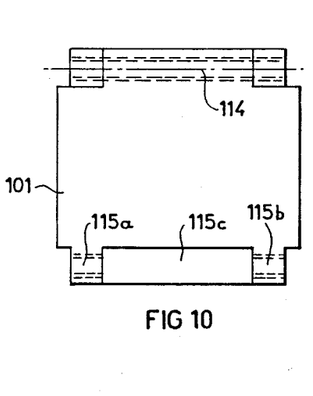
FIG. 10 is a top plan view illustrating one section of a second embodiment of the invention.
Figures 11, 13:
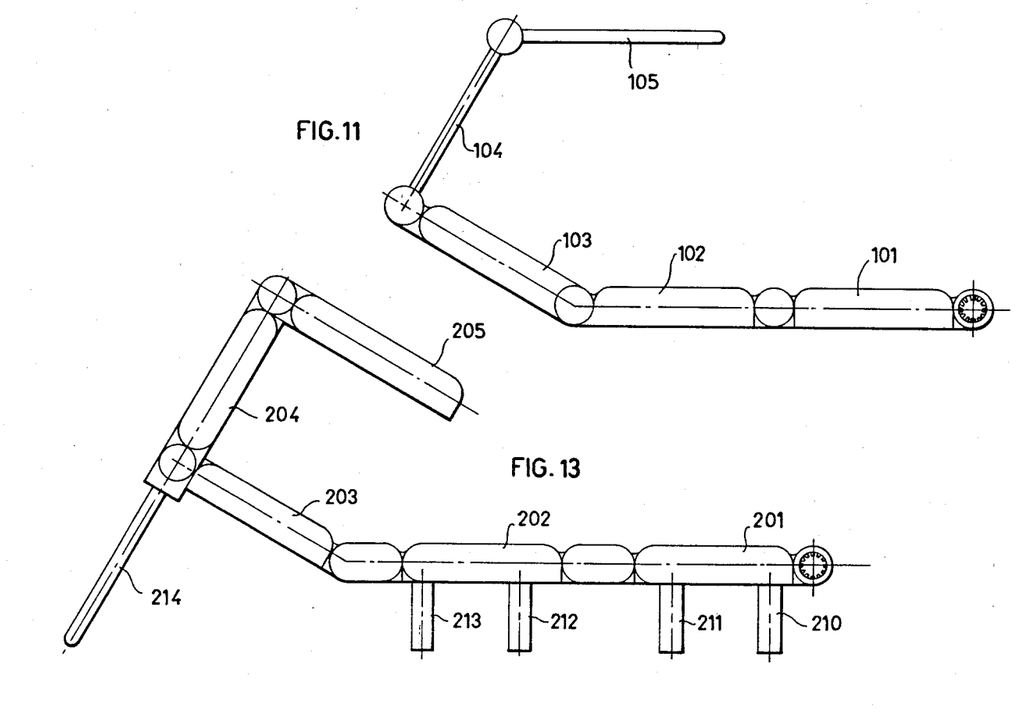
FIGS. 11 and 12 illustrate two configurations of the article of furniture according to the embodiment of FIG. 10.
FIG. 13 illustrates an article of furniture constructed with sections according to the embodiment of FIGS. 1 and 2 and with further sections according to the embodiment of FIG. 10.
Figure 12:
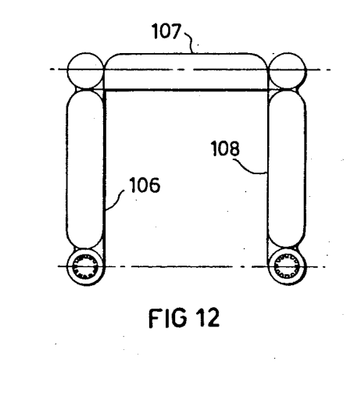
Figure 14:
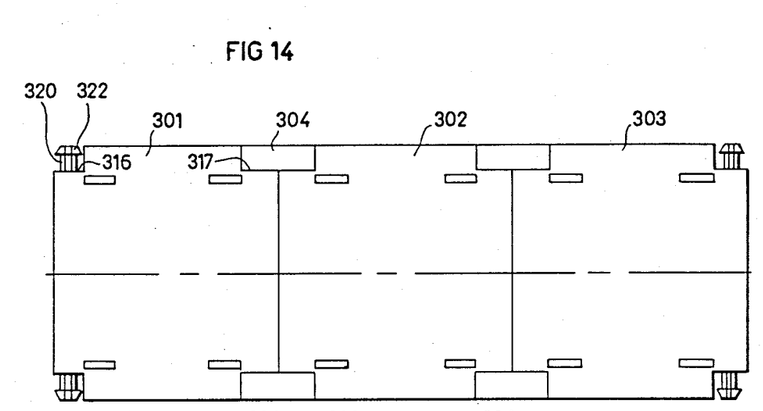
FIGS. 14–21 illustrate a third embodiment of the invention in the form of a collapsable bed or table, FIGS. 14, 15, 16 and 17 being top, side, end and bottom views, respectively, FIG. 18 being a longitudinal sectional view, FIG. 19 being an enlarged, fragmentary sectional view more particularly illustrating the structure of the links, FIG. 20 being a transverse sectional view along line XX—XX of FIG. 17, and FIG. 21 being a side view illustrating the folded condition of the bed or table.
Figure 15:
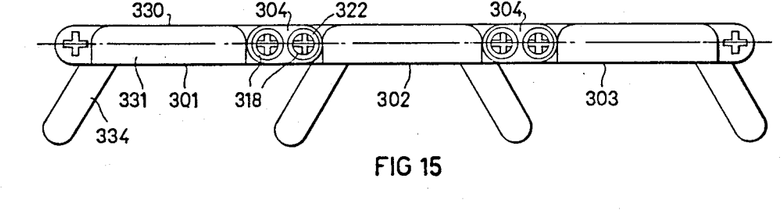
Figure 16:
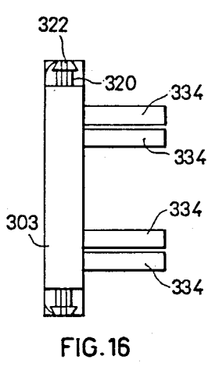

FIG. 10 illustrates another embodiment of the invention wherein the basic plastic section, therein designated 101, has been modified; and FIGS. 11, 12 and 13 illustrate different configurations of furniture articles utulizing this modified construction. A basie difference in this embodiment over that of FIGS. 1 and 2, is that in the modified construction of FIG. 10 the links 6 are omitted. For this reason, socket 114 at one end of the basic section 101 is located centrally of the section, as socket 14 in the FIGS. 1 and 2 embodiment, but the opposite end of the section includes two sockets 115a, 115b spaced apart from each other by a space 115c such as to accomodate socket 114 of the next adjacent section. As shown in FIG. 10, sockets 115a and 115b are spaced inwardly from the outer edge of the respective section a distance to accomodate the head (19, FIG. 6) of the pin (5) received in the respective ends of two adjacent sections.

In the modification illustrated in FIG. 10, the pins and sockets may also be splined, as in the embodiment illustrated in FIGS. 1 and 2, so as to permit a plurality of basic sections, all as illustrated in FIG. 10, to be assembled together at different angular positions with respect to each other to define various articles of furniture, or to define a single article of furniture capable of different angular adjustments. However, in all these embodiments the pins, sockets (and links, when included) may be unsplined to permit the sections to be pivotted to different angular positions without removal of the pins.

FIG. 11 illustrates one assembly configuration including five sections (standard-width sections 101, 102, 103 and thinner sections 104, 105) assembled in the configuration of a cot resting on the ground and including a sunshade; and FIG. 12 illustrates three basic sections (106, 107 and 108) assembled in the configuration of a table.

It will be appreciated that by omitting the links (5) in the modification of FIGS. 10–12, the angle at which each section may be joined to the next is limited to about 210°, rather than being unlimited and within the full range of 360° as in the embodiment of FIGS. 1 and 2.

FIG. 13 illustrates a hybrid construction, including three sections 201, 202, 203 according to FIGS. 1 and 2, and two further sections 204, 205 according to the modification of FIG. 10, all assembled in the form of a cot having a sun shade. Sections 201 and 202 each include supporting legs 210-213 corresponding to legs 6 in FIGS. 1 and 2; and the socket end of section 204 includes additional legs 214, of longer length, and inserted in holes formed in these respective sockets.

The Embodiment of FIGS. 14-21

FIGS. 14-21 illustrate a further embodiment of the invention, in the form of a bed or table which may be opened to an operative position for use, or folded into compact form for storage or transportation. The article illustrated in these figures also comprises three basic plastic sections 301, 302, 303, each curved at its opposite ends according to the same radius of curvature, and each formed with a notch 316, 317 at its opposite ends of a length twice that of the radius of curvature of the respective end of the section. However, a different fastener arrangement is used for coupling the ends of the sections together.

Thus, the fastener arrangement includes a plurality of links 304 each of a length twice that of one of the notches 316, 317, and receivable within them when the two sections are extended in aligned side-by-side relationship, as in the embodiment of FIGS. 1-9. Links 304 are also formed with a pair of sockets 318 for receiving pins, but in this case the pins are secured to the plastic sections within their notches 316, 317. Thus, as shown particularly in FIGS. 14 and 19, each corner of each plastic section includes a pin 320 formed with a conical head 322 whose outer edge is flush with the outer edge of the respective plastic section. Preferably, the pins 320 and their heads 322, and the sockets 318 within links 304, are splined as in the embodiment of FIGS. 1-9 to fix the angular position of the plastic sections, but they could be unsplined so as to permit the plastic sections to be pivoted with respect to each other without the necessity of removing the links for this purpose. In the illustrated embodiment, each pin 320 is of "+"-cross-section and is formed with a conical head; and each link socket 318 is merely a bore of complementary configuration.

As in the embodiment of FIGS. 1-9, each plastic section may also be of flat sheet material 330 (FIG. 18) formed with a downwardly bent peripheral flange 331. In addition, the underface of each plastic section 301, 302, 303 is formed at each end with a pair of inwardly facing sockets 332 (FIG. 17) for receiving a U-shaped leg member 334. The latter member includes a pair of legs 334a, 334b joined together by a bridge 334c, all made of plastic material. Bridge 334c is integrally formed with cylindrical end pieces 335 (FIG. 20) rotatably received within the inwardly facing sockets 332. This bridge is somewhat elastic so as to permit it to be deformed, by grasping the two legs 334a, 334b, and moving them towards each other, in order to snap-fit the bridge into a pair of the inwardly facing sockets 332. A pair of sockets 332 is formed at each of te two ends of each plastic section 301, 302, 303, to permit a U-shaped leg member to be applied to either end, or to both ends if desired.

Figures 17, 19, 21:
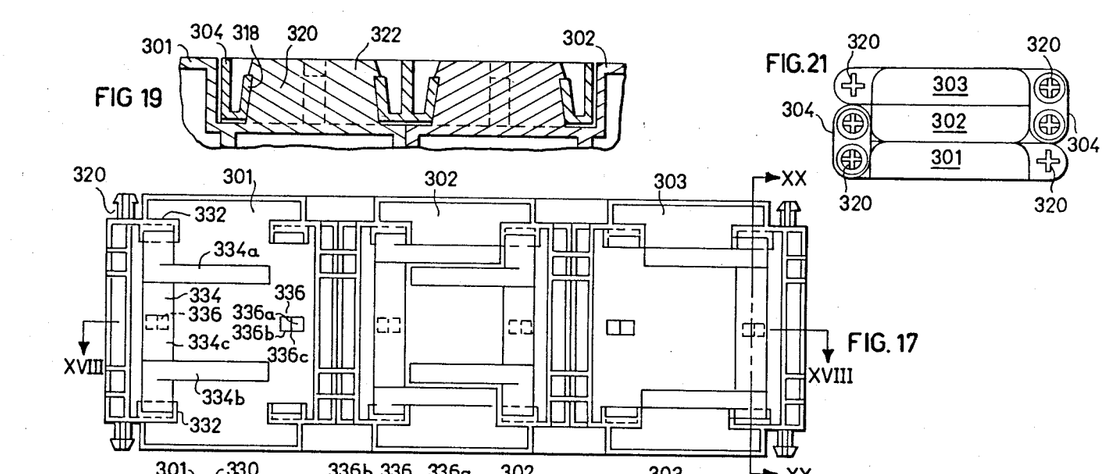

The underface of each plastic section 301, 302, 303 is further formed with a cam 336 in alignment with, and midway between, each pair of sockets 332. Cam 336 cooperates with bridge 334c of the U-shaped leg member 334 applied to the respective pair of sockets 332. Thus, each cam 336 includes a first cam surface 336a engageable with the bridge 334c of the respective U-shaped leg member 334 in the extended operative position of the latter member for maintaining same in its extended position, and a second cam surface 336b separated from cam surface 336a by a high point 336c permitting the leg member to be pivoted to its folded position within the downturned flange 331 of the plastic section, as shown in FIG. 20, when the three plastic sections are folded into compact form, as shown in FIG. 21, for storage or transportation.

Figures 18, 20:
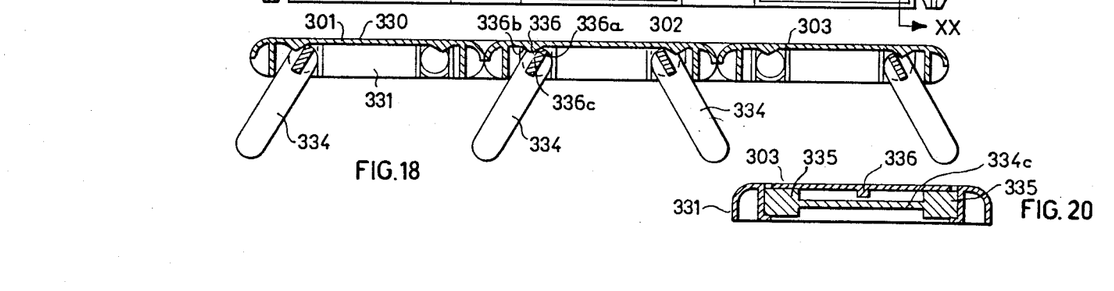
Figure 22:
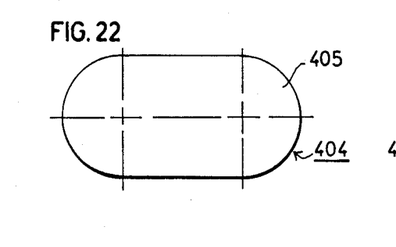
FIGS. 22–26 illustrate a further embodiment of the invention particularly useful as a folding portable bed, FIGS. 22–24 being top, side and bottom elevational views, respectively, of a modified link construction, FIG. 25 being a fragmentary sectional view corresponding to FIG. 19 but illustrating the modified link construction, FIG. 26 being an enlarged sectional view along lines XXVI—XXVI of FIG. 25 and FIG. 27 illustrating the folded condition of the portable bed.
Figure 23:
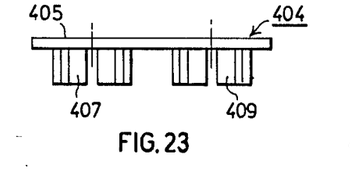

The manner of using the bed or table illustrated in FIGS. 14-21 will be apparent from the above description. Thus, the three (or more) plastic sections 301, 302, 303 may be quickly assembled together by merely applying the links 304 to the two pins 320 at the ends of each pair of sections to be joined together, and the legs may be applied by merely flexing bridge 334c of each leg member 334 to snap the ends 335 of the member into a pair of the inwardly facing sockets 332 at the underside of each plastic section. The legs may then be pivoted to their open positions as illustrated in FIG. 18 wherein their bridges 334c engage cam surfaces 336a of cams 336. The assembly of the illustrated bed or table may thus be done in a quick and convenient manner without the need of screws or other types of fasteners.

Whenever it is desired to fold the bed or table into a compact form for storage or transportation, the leg members are pivoted to their closed positions against the underface of the plastic sections and within their depending flanges 331, as shown in FIG. 20, and are retained in this position by cam surface 336b engaging bridges 334c of the leg members. The three plastic sections 301, 302, 303 may then be pivoted to their folded condition as illustrated in FIG. 21.

It will be appreciated that if the pins (e.g. 5 in FIGS. 1-8 or 320 in FIGS. 14-21), and the link sockets in which they are received, are splined, the links will retain the panel sections in their pivoted positions, and therefore it is necessary to remove them whenever the panel sections are to be pivoted to another pivotable position. It will also be appreciated, however, that these members need not be splined, in which case the removal and reapplication of the links would not be necessary in order to pivot the panel sections to other positions.

The Embodiment of FIGS. 22-26

FIGS. 22-26 illustrate a modification in the construction of the embodiment of FIGS. 14-21 particularly useful as a folding portable bed or cot, enabling the bed or cot to assume any one of three conditions, namely: an open condition for normal use, wherein the plastic sections are opened into alignment with each other; a closed condition for transportation or storage, wherein the plastic sections are folded on top of each other; and an intermediate condition wherein the plastic sections are disposed perpendicular to each other for supporting the user in a sitting position.

The main difference in the embodiment illustrated in FIGS. 22-26 is in the construction of the links, therein designated 404, for coupling adjacent sections to each other. Thus, each link 404 includes a head 405 which is not apertured, but rather is integrally formed with ribs 407, 409 cooperable with the pins 420 integrally formed at the ends of the adjacent plastic sections 401, 402 coupled by the links 404. These ribs 407, 409 are slotted, as shown particularly in FIGS. 23 and 24. Slotted ribs 407, 409 constitute the sockets for receiving the pins 420 integrally formed at the ends of the joined plastic sections 401, 402. As in the embodiment described above with respect to FIGS. 14–21, these pins 420 are also of "+"-cross-section, including ribs 420a (FIG. 26) and ribs 420b extending at right angles to ribs 420a.

Ribs 407, 409 of links 404 are formed with three pairs of slots for receiving pins 420 in any one of three positions so as to align the two plastic sections 401, 402 integrally formed with pins 420 in any one of three positions with respect to each other. In the position illustrated in FIG. 26, ribs 420a are received within slots 411a of ribs 407 and 409 so that link 404 joins the two plastic sections 401, 402 in alignment with each other, i.e. forming an angle of 0° with respect to each other; this is the normal condition of the portable bed for use.

Figure 27:
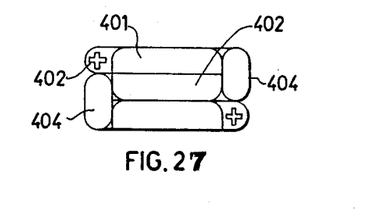

Ribs 407 and 409 on link 404 are further formed with a second pair of slots 411b (FIG. 24) at right angles to slots 411a such that when ribs 420a of pin 420 are received within these slots, each end of the link is 90° with respect to the plastic section secured thereto; the two plastic sections are thus parallel to each other in the folded condition of the bed as illustrated in FIG. 27 for storage or transportation.

Figure 24:
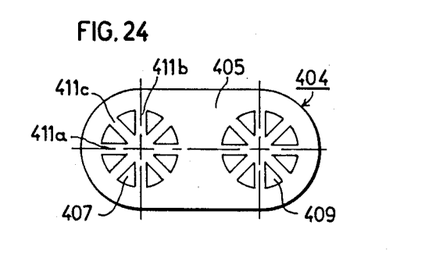
Figure 25:
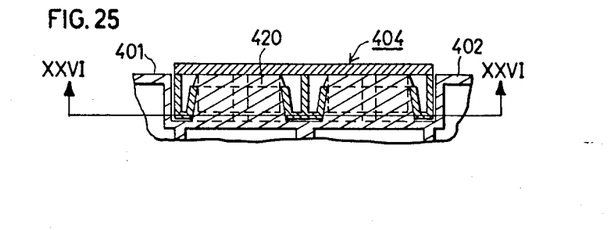
Figure 26:
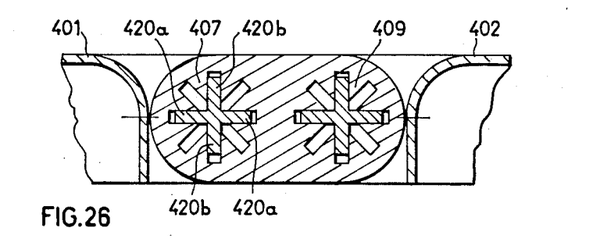

Ribs 407 and 409 on link 404 include a third pair of slots, represented by slots 411c in FIG. 24, to receive the pins 420 at an intermediate position; when ribs 420a of pins 420 are received within slots 411c of the links, each end of the link secures its plastic section 401, 402 at an angle of 45° thereto, so that the angle between the two plastic sections 401, 402 would then be 90°, for supporting the user in an upright sitting position.

The construction and operation of the bed or cot illustrated in FIGS. 22–26 is otherwise the same as described above with respect to FIGS. 14–21.

While the invention has been described with respect to several preferred embodiments, it will be appreciated that many other variations, modifications and applications of the invention may be made.

What is claimed is:

1. An article of furniture characterized in that it includes a plurality of sections each curved at its opposite ends according to the same radius of curvature, each section having notches at its opposite ends of a length twice that of said radius of curvature, and fastener means receivable in said notches of adjacent sections and coupling said sections together; said fastener means comprising a link having a length twice that of said notches and receivable in the notches of two adjacent sections, and a pair of pins for each link, each pin coupling one end of its link to one of the two adjacent sections coupled thereby.

2. The article of furniture according to claim 1, wherein said links are formed with sockets for receiving said pins.

3. The article of furniture according to claim 2, wherein said pins are separate members received within said sockets formed in said links.

4. The article of furniture according to claim 3, wherein said pins and sockets are formed with complementary interengaging splines to fix said plurality of assembled sections in predetermined angular positions.

5. The article of furniture according to claim 3, wherein said pins and sockets are all unsplined to permit separality of assembled sections to be pivoted to different angular positions without removal of said pins.

6. The article of furniture according to claim 2, wherein said pins are fixed to said sections.

7. The article of furniture according to claim 6, wherein said pins are formed with conical heads.

8. The article of furniture according to claim 6, wherein said links are formed with bores constituting said sockets for receiving said pins.

9. The article of furniture according to claim 8, wherein said pins are of "+"-cross-section.

10. The article of furniture according to claim 6, wherein said links are formed with slotted ribs constituting said sockets for receiving said pins.

11. The article of furniture according to claim 10, wherein said pins are of "+"-cross-section, and said ribs in the links are slotted to receive the pins in a plurality of positions, including an open position wherein each end of the link forms an angle of 0° with respect to the two sections coupled thereby, and a folded closed position wherein each end of the link forms an angle of 90° with respect to the two sections coupled thereby.

12. The article of furniture according to claim 11, wherein said links are slotted to receive the pins in a third position, wherein each end of each link forms an angle of 45°, such that the two sections coupled thereby are fixed at 90° to each other.

13. The article of furniture according to claim 1, wherein each of said sections is formed of sheet material having a downwardly bent flange, said article of furniture further including a pair of inwardly facing sockets formed in the underface of said sheet material, and legs receivable within said latter sockets and pivotable therein either to an extended position to support said sections horizontally for use, or to a folded position against its respective section to permit said sections to be folded compactly against each other for storage or transportation.

14. The article of furniture according to claim 13, wherein said legs are in the form of U-shaped members each including a pair of legs joined together by a bridge, each of said bridges being resilient to permit the respective leg member to be snapped into said inwardly facing sockets at the underside of each section.

15. An article of furniture characterized in that it includes a plurality of sections pivotably coupled to each other at their ends, each of said sections including a pair of inwardly facing sockets depending from one face thereof; and legs receivable within said sockets and pivotable therein either to an extended position to support said sections horizontally for use, or to a folded position folded against said sections to permit the sections to be folded compactly against each other for storage or transportation; said legs being constituted of U-shaped members each including a pair of legs joined together by a bridge, each of said bridges being resilient to permit the respective U-shaped member to be snapped into said sockets of the downwardly bent flanges for mounting therein.

16. The article of furniture according to claim 15, wherein each of said sections is formed with a cam formation having a first cam surface engageable with the bridge of the respective U-shaped leg member in the extended, operative position thereof for maintaining same in said position, and a second cam surface separated from said first cam surface by a high point permitting the U-shaped leg member to be pivoted to its folded position for storage or transportation.

17. The article of furniture according to claim 15, wherein each of said sections is of plastic material, and each of said U-shaped leg members is also of plastic material.

* * * * *